United States Patent [19] [11] 4,177,640
Kuroda et al. [45] Dec. 11, 1979

[54] INTERNAL COMBUSTION ENGINE SYSTEM

[75] Inventors: Hiroshi Kuroda, Tokyo; Yasuo Nakajima, Yokosuka; Yoshimasa Hayashi, Yokohama, all of Japan

[73] Assignee: Nissan Motor Company, Limited, Yokohama, Japan

[21] Appl. No.: 793,492

[22] Filed: May 4, 1977

[30] Foreign Application Priority Data

May 7, 1976 [JP] Japan .......................... 51/58134[U]

[51] Int. Cl.² .................... F02M 25/06; F02B 75/18
[52] U.S. Cl. ......................................... 60/274; 60/278;
60/293; 123/52 M; 123/59 A; 123/193 H
[58] Field of Search ............... 123/59 A, 59 R, 52 M,
123/30 C, 193 H; 60/293, 278, 282, 305, 274

[56] References Cited
U.S. PATENT DOCUMENTS

| 2,108,740 | 2/1938 | Belford | 123/52 M |
| 2,380,066 | 7/1945 | Pescara | 123/52 M |
| 2,469,448 | 5/1949 | Barber | 123/30 C |
| 2,576,819 | 11/1951 | Angle | 123/193 H |
| 3,662,541 | 5/1972 | Sawada | 60/293 |
| 3,791,144 | 2/1974 | Lang | 60/278 |
| 4,022,019 | 5/1977 | Garcea | 60/282 |
| 4,069,666 | 1/1978 | Nakamura | 60/305 |

FOREIGN PATENT DOCUMENTS 394800 7/1933 United Kingdom ............... 123/193 H

Primary Examiner—Douglas Hart

[57] ABSTRACT

Hemispherical combustion chambers of a cross flow type cylinder head, having symmetrically disposed and synchronously sparked plugs are fed a near stoichiometric air fuel mixture containing up to 40% EGR gas which after combustion is exhausted through individual ports, mixed with secondary air supplied by a simple reed valve and oxidized in a catalytic converter.

17 Claims, 3 Drawing Figures

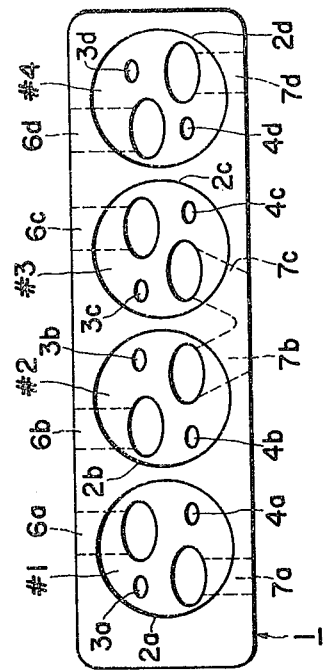
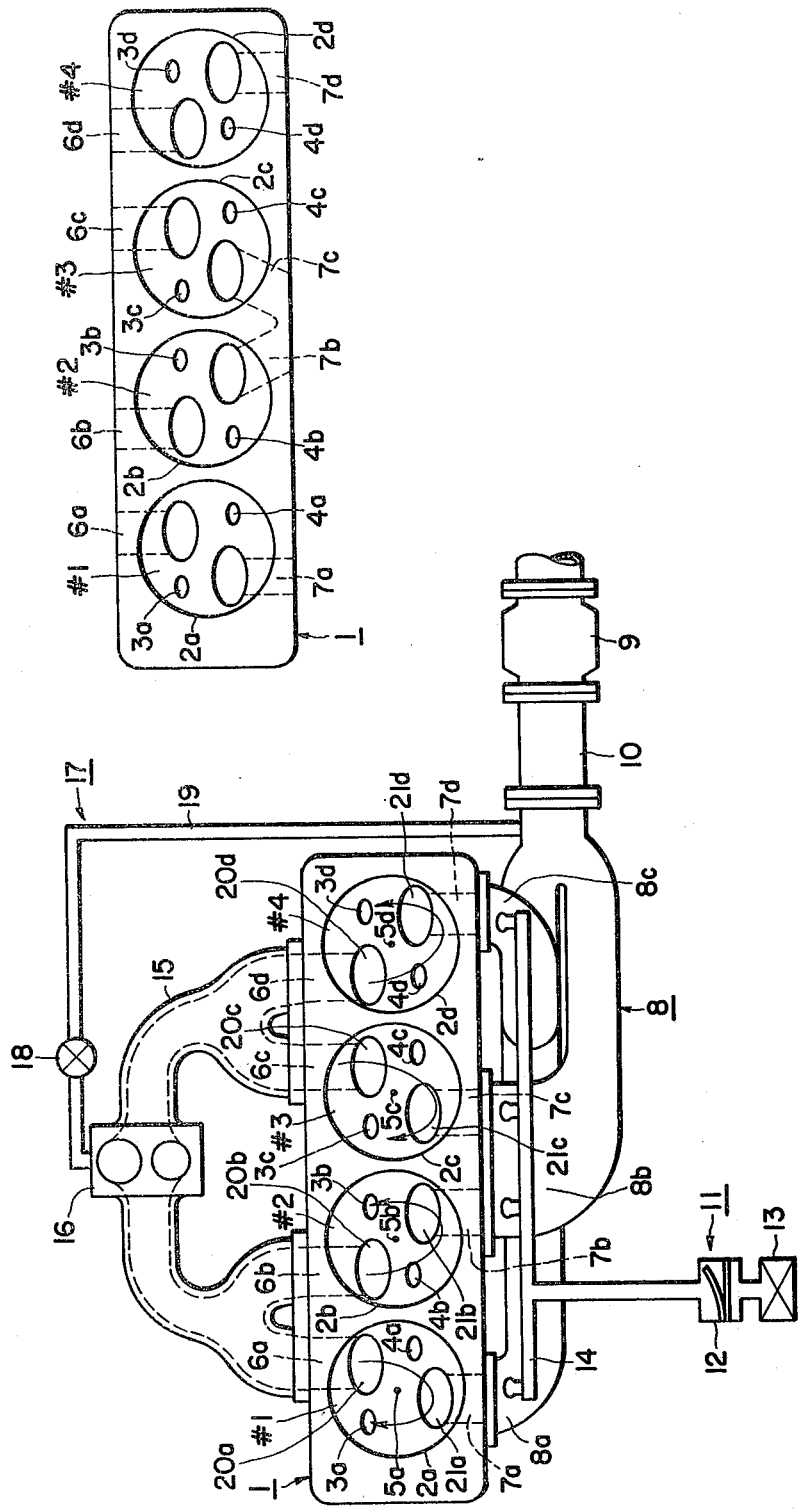

INTERNAL COMBUSTION ENGINE SYSTEM

BACKGROUND OF THE INVENTION

1. Field of the Invention

This invention relates to an internal combustion engine and more particularly to an improved internal combustion engine system which emits very little or no noxious gaseous material into the atmosphere and at the same time undergoes no loss of power and fuel economy and a method of operating same.

2. Description of the Prior Art

As is well known in the interest of environmental protection it is highly desirable to develop an internal combustion engine which produces little or no pollution produces usable amounts of power and at the same time does not use unduly large amounts of gasoline (i.e. is economical).

Many attempts have been made to develop an internal combustion engine of the type described above but as yet a completely successful working model has not been produced. Some engines thus far proposed have approached a successful solution but have suffered from at least one major drawback. For example, the so-called torch ignition type engine has under some modes of operation managed to reduce the emissions of NOx, CO and HC to desirable levels but at the expense of enormous complexity of the cylinder head and carburetor and/or injection system, i.e. the cylinder head is formed with not only a main combustion chamber but a pre or torch chamber, inlet passages to both, inlet valves for each and an air fuel mixture supply system which maintains a necessary difference between and varies according to the operational mode of the engine the air fuel ratios of the air-fuel mixture separately fed to each chamber. The production assembly and maintenance of such a complex cylinder head is of course undesirable. Other disadvantages of the torch ignition engine are, the large internal surface area of the two chambers, which invariably means a high HC emission concentration, and the rather poor fuel consumption characteristics exhibited at low speed, RPM modes of operation.

In contrast to the complex torch ignition engine, a dual spark plug rotary engine has been proposed. The simplicity of the single combustion chamber and only two spark plugs on paper seems ideal, nevertheless it has been plagued with rather serious problems of sealing the ends of the rotor or rotors, trochoidal housing wall chatter and poor fuel economy.

This wankel type rotary engine has met with some initial success due to its light weight and high power output characteristics but the long term use of this unique design is still in doubt at this time.

A number of reciprocating type counterparts of the twin spark plug rotary engine have also been proposed. Like the rotary engine these have usually used non synchronous sparkings of the plugs in an effort to stably ignite lean to very lean air fuel mixtures. Some of these have exhibited rather outstanding fuel economy but have lacked power especially during the acceleration mode of engine operation.

In some cases the above described reciprocating dual spark plug engines have employed a small amount of exhaust gas recirculation in an effort to further reduce the NOx generation already partially reduced by the employment of the lean air fuel mixture. However as the rate of EGR is raised the combustion in the combustion chambers becomes unstable and emission levels of HC and CO immediately rise, not to mention the power output falls almost to zero.

One arrangement which has met with some success is an engine operated on a rather lean air fuel ratio which is ignited by two synchronously sparked plugs, employs EGR to further suppress NOx generation and is followed by a lean type thermal reactor which receives exhaust gases through siamesed lined exhaust ports; the latter being provided in an attempt to maintain the critically necessary high temperature to promote secondary oxidation.

However it is still necessary to provide an internal combustion of the aforementioned type which is improved simpler in construction and does not suffer from any lack of performance, especially during acceleration due to operation on a lean air fuel mixture.

SUMMARY OF THE INVENTION

Hence an internal combustion engine system according to this invention has been developed which successfully solves all of the problems encountered by the prior art via the use of relatively simple and easily produced (and therefore inexpensive) components, and which is suitable for use in a high performance type vehicle.

More explicity the engine system according to this invention has and employs in combination:

a cross-flow type cylinder head having therein simply configured combustion chambers of the type for example having a hemispherical shape and in each of which two spark plugs are symmetrically arranged to be equidistant from the cylinder axis and on the same diameter and synchronously sparked so as to enable a very high rate of NOx suppressing exhaust gas recirculation or EGR to be used whereby the production or generation of the aforementioned noxious gaseous compound is all but eliminated;

an air fuel mixture which has a stoichiometric or slightly richer air fuel ratio which ensures adequate power output and performance;

individual or non siamesed exhaust ports (insulatingly lined if desired) which eliminate the secondary air supply reducing interference via the interaction of the modified pulsations within the exhaust manifold produced by siamesed ports thus permitting the use of a simple reed valve in lieu of a complex power consuming air pump for the supply of secondary air;

a simply configured exhaust manifold which may be insulatingly lined which communicates with an oxidizing type catalytic converter provided downstream of the manifold where sufficiently hot exhaust gases are fed therein from the manifold (the temperature of the gases fed into an oxidizing catalytic converter needing not be maintained to the same degree as in the case of a thermal reactor); and a simply configured induction manifold which may be shorter than normal (due to the port arrangement) whereby the distribution of the air fuel mixture fed to each cylinder via almost equal flow paths is more uniformly distributed.

OBJECTS OF THE INVENTION

It is therefore an object of this invention to provide an internal combustion engine which through the combination of relatively simple apparatus produces little or very little noxious matter such as HC, CO and NOx.

It is also an object of this invention to provide an internal combustion engine system which is comprised of a combination of relatively simple apparatus and is therefore economical to manufacture, use and maintain.

It is still a further object of this invention to provide an internal combustion engine system which employs a pair of symmetrically disposed (i.e. equidistant from the cylinder axis and on the same diameter) and synchronously sparked spark plugs per combustion chamber, said combustion chamber having a simple configuration selected from amongst the group comprising hemispherical, bath tub, heron and flat head.

It is another object of this invention to provide an internal combustion engine system which is operated on a near stoichiometric or richer air fuel mixture and therefore suffers no loss of performance and power output.

Yet another object of this invention is to employ a very high EGR rate which in combination with the two spark plugs per combustion chamber reduces the generation of NOx during combustion of the near stoichiometric charge.

It is yet another object of this invention to provide an internal combustion engine system with individual exhaust ports (non siamesed ports) for the discharge of the exhaust gases therethrough into a exhaust manifold so that secondary air supplied via the exhaust gas pulsations thereinto is not reduced as in the case of pulsations produced by siamesed ports.

Still another object of this invention is to provide an internal combustion engine system which has an oxidizing type catalytic converter provided in the exhaust system thereof to eliminate the need to maintain the exhaust gas temperature at an extremely high level as in the case of a thermal reactor.

A BRIEF DESCRIPTION OF THE DRAWINGS

Further features, objects and advantages will become more apparent as the discription proceed taken in conjunction with the accompanying drawings in which:

FIG. 1 is a schematic plan view of a first embodiment of an internal combustion engine according to this invention;

FIG. 2 is a schematic plan view of a cylinder head similar to that of the engine of FIG. 1 but showing a second possible port arrangement.

Figure 3:
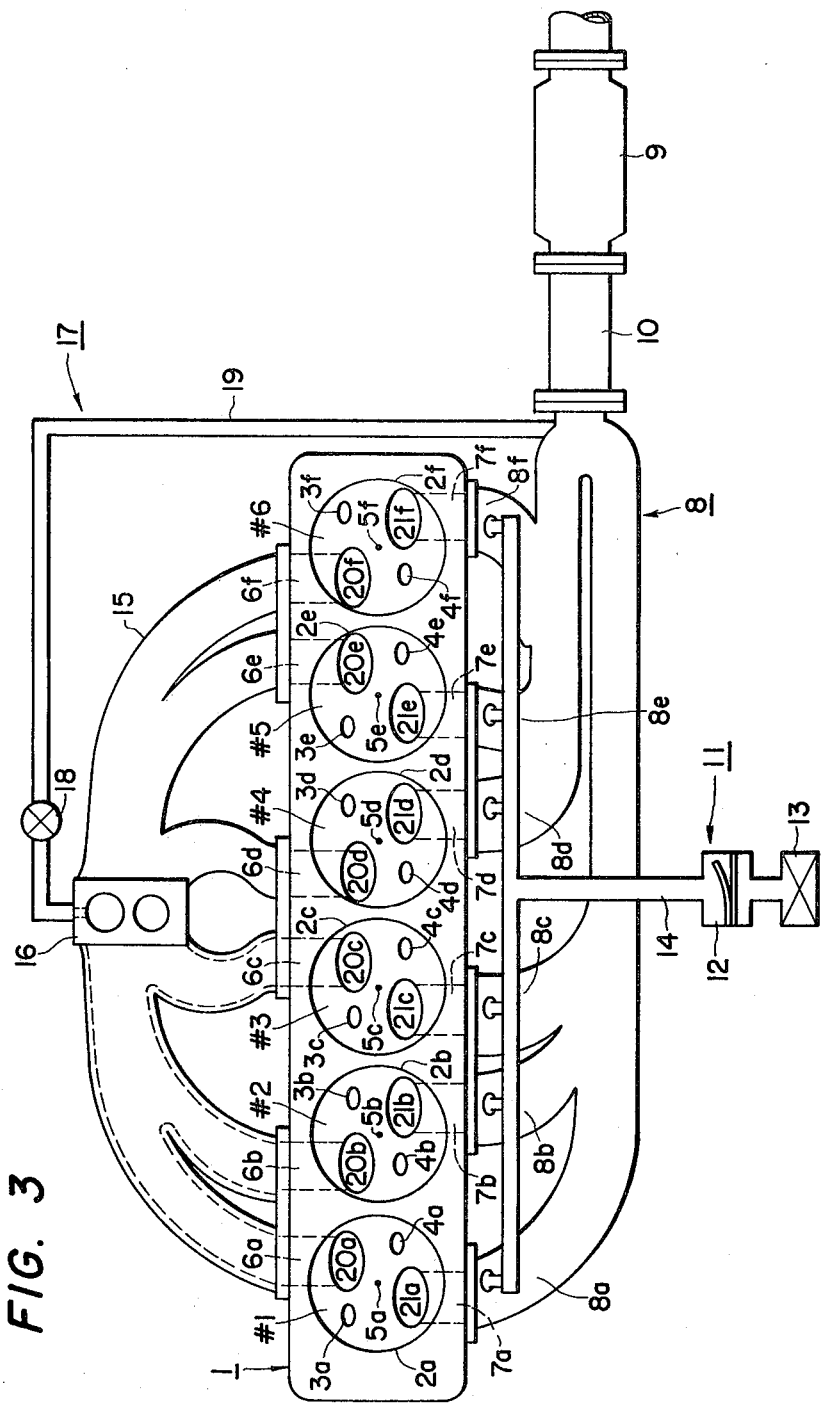
FIG. 3 is a schematic plan view of a second embodiment of an internal combustion engine according to the invention.

Let us look at FIG. 1 which is a schematic plan view of a four cylinder in line internal combustion engine according to the first embodiment of this invention. Indicated by the numeral 1. is a cross-flow type cylinder head having formed therein four combustion chambers 2a, 2b, 2c and 2d which define the upper portions of the cylinders #1, #2, #3 and #4, respectively. Disposed in each combustion chamber is a pair spark plugs, i.e. in cylinder #1, plugs 3a and 4a are disposed, in #2, 3b and 4b, in #3, 3c and 4c, and in #4, 3d and 4d. Operatively disposed through and sealingly seatable on the cylinder head 1 are a plurality of intake valves 20a, 20b, 20c and 20d, each arranged to provide or cut communication between combustion chambers 2a, 2b, 2c and 2d and an induction or intake manifold 15 via inlet ports 6a, 6b, 6c and 6d, respectively. Similarly disposed are a plurality or exhaust valves 21a, 21b, 21c and 21d which provide or cut communication between the combustion chambers 2a, 2b, 2c and 2d and an exhaust manifold 8 via exhaust ports 7a, 7b, 7c and 7d. Furthermore as shown the outboard exhaust ports 7a and 7d are arranged to open into a first branch portion of the exhaust manifold 8 and the two inboard ports 7b and 7c are arranged to open into a second branch portion. This construction has the advantage of isolating the exhaust pulsations emitted from the engine. The reason for this will become clearer as the description proceeds. The first and second branch portions are joined and connected to an exhaust pipe or tube 10 in which there is disposed an oxidation type catalytic converter 9.

A secondary air supply system generally denoted by 11 has a plurality of inlet branches (no numeral) each of which open into or in the near vicinity of an exhaust port to intimately mix the secondary air supplied therethrough with the exhaust gases discharged through said exhaust ports and transmit the exhaust gas pulsations into a supply conduit 14. As shown the conduit 14 is branched and has a reed valve 12 or the equivalent disposed at the end thereof which is subjectable to the exhaust gas pressure variations or pulsations introduced into the conduit 14 via the branched inlet portions. As is well known to one skilled in the art the function of such a reed valve is to induct secondary air via the influence of the exhaust gas pulsations thus eliminating the need for an air pump. An air cleaner 13 is mounted so as to remove air born dusts and thus permit the introduction of clean dust free air into the supply conduit 14.

An EGR system generally denoted by the numeral 17 is shown interconnecting the exhaust manifold 8 and the inlet manifold 15 downstream of the carburetor 16 via a conduit 19. Operatively disposed in the conduit 19 is a control valve 18 which is as usual arranged to proportion the amount of exhaust gases introduced downstream of the carburetor with respect to the amount of air inducted through the carburetor venturi portion (or the vacuum existing in the venturi portion which is indicative of the volume of air passing therethrough). Although not shown the conduit 19 is arranged to be subjected to a cooling blast of air provided by means such as the cooling fan of the engine, so that excessively hot gases are not dangerously introduced into the induction manifold.

Now as seen the inlet valves 20a, 20d of the two endmost or outboard cylinders #1, #4 are arranged inboard of the corresponding exhaust valves whereby the overall length of the induction manifold is reduced. Furthermore the inlet valves of the two inboard cylinders are arranged outboard of the corresponding exhaust valves thus reducing the distance between the adjacent inlet ports 6a and 6b, and 6c and 6d. This arrangement is advantageous in that the induction manifold can be formed as shown with two branches feeding the air fuel mixture from the carburetor; the end portions of each of said branches being further branched to communicate with the four inlet ports. The thus symmetrically constructed induction manifold minimizes the difference in flow path length from the carburetor and each cylinder and minimizes said length, whereby a very even distribution of the air fuel mixture is assured.

It will be also noted that the inlet and exhaust ports of each cylinder are located to substantially, open into diametrically opposed quadrants defined by a longitudinal plane (not shown) passing through each cylinder axis and a plane (not shown) normal to the longitudinal plane and which also passes through the cylinder axis. This serves to introduce the air fuel mixture in such a manner that the charge (air fuel and EGR gas mixture) is swirled about the combustion chamber as shown by the arrows in FIG. 1. Although not shown to optimize the swirl it is desirable to form the inlet ports in such a manner that the charge is not introduced into the combustion chambers at an angle which causes the same to have a large downward momentum, and therefore maximizes the horizontal momentum (wherein the cylinder axis is used to indicate the vertical) so to achieve a desirable high rate of swirl (i.e. a desirably high angular momentum).

It is well known that the internal surface area of the combustion chamber is a source of HC since it is virtually impossible to prevent a very thin layer of the hydrocarbon containing charge from undergoing the so-called "quench" phenomenon during combustion. This phenomenon is caused by the gases in contact with the combustion chamber inner surface by being cooled (by the contact therewith) to a point where combustion thereof is impossible, the flame front being extinguished or quenched on entering or contacting this cooled layer.

Swirl is an extremely effective way of reducing the thickness of this layer but in order to further desirably reduce the unburned HC concentration a combustion chamber having a shape which maximizes volume and minimizes internal surface area is of great utility. Thus combustion chamber configurations such as the hemispherical configuration the bath tub, heron and flat head configurations are preferably employed in this invention. Although from this point on only a hemispherical configuration will be referred to, it is to be understood that it is interchangeable with any other simple configuration which includes those listed above. To add to the effectiveness of the above described swirl while maintaining a suitable compromise with respect to an increase in the quench area it is possible to design the combustion chamber to have a squish area of 0.1 to 0.35 times the cross sectional area of the cylinder. Although this adds to the quench area it increases the turbulence or swirl within the combustion chamber which promotes stable combustion of the charge therein, and is especially useful in the case where a large amount of exhaust gases are recirculated.

It has been observed that as the amount of EGR increases the burning time of the charge increases and the peak combustion temperature is reduced thus reducing the concentration of NOx produced. In practice, however it has been found that above a given degree or rate of EGR the burning or combustion time of the charge becomes so long that stable and reliable combustion is impossible. Therefore the maximum amount of EGR and subsequent reduction of NOx has been limited. However in this first embodiment according to this invention it is proposed that two symmetrically and synchronously sparked spark plugs be disposed in each combustion chamber. This arrangement is of extreme importance in this invention because it provides several advantageous features which are: two flame fronts are produced simultaneously to propagate through the combustion chamber to greatly reduce the combustion time which would result from using only one plug. Hence in the presence of a large amount of peak combustion temperature reducing EGR gas the normally unworkably long combustion time is reduced to a point where workable and reliable combustion is possible, providing a method of reducing the concentration of NOx to a desirable level and simultaneously making it possible to delay (because the combustion time is so short) the actual sparking of the spark plugs so that the piston is permitted to approach TDC (in each combustion chamber) compressing and heating the charge to a point where reliable ignition is easily initiated. Thus in summary, ignition with two synchronously sparked plugs near TDC in the presence of a large amount of EGR gas makes possible high power output with the minimum of NOx formation.

Furthermore as is well known, the combustion of an air fuel mixture of the stoichiometric air fuel ratio maximizes the formation of NOx and minimizes the formation of HC and CO. Thus since in the above described and constructed combustion chamber, the formation of NOx is all but eliminated via the reduction of the peak combustion temperatures by using a high EGR rate, it is desirable according to this invention to feed the combustion chambers a stoichiometric air fuel ratio to thereby reduce the concentrations of HC and CO formed and simultaneously derive the maximum amount of power from the fuel combusted. Thus in summary, it is desirable to feed the engine an air fuel mixture having an air-fuel ratio of between 13:1 and 16:1 and more preferable near to or just slightly richer than the stoichiometrical air fuel ratio of 14.7:1 (in the case of gasoline); and recirculate exhaust gases at a rate of up to 40%.

If it is desired to employ a thermal reactor or the equivalent it is desirable to maintain the exhaust gases at a very high temperature via the use of port liners and/or delayed ignition timing for promoting secondary combustion. However in the case where EGR is employed, the task is made more difficult by the fact the EGR in fact reduces the peak combustion temperature and consequently the temperature of the exhaust gases exhausted through the exhaust ports. Thus in the case where a large amount of EGR gases are recirculated, the temperature of the exhausted gases is even lower making it extremely difficult to promote secondary combustion in a thermal reactor. Hence it is desirable according to this invention to use a catalytic converter which is not so dependent on high temperatures for its efficiency and thus circumnavigates the above temperature maintaining problem. The use of the catalytic converter also makes it unnecessary to employ and cast the cylinder head with lined siamesed exhaust ports and is preferred according to this invention because it makes possible the employment of a secondary air supply system having a reed valve in lieu of an air pump. In the case of siamesed exhaust ports difficulties have been encountered with secondary air supply system equipped with reed valves because the exhaust gas pulsations follow one on top of the other as it were reducing the necessary low pressures necessary for inducting the secondary air within the exhaust manifold especially at high RPM.

Port liners may be installed in the exhaust ports if desired and the exhaust manifold similarly lined or otherwise insulated to maintain the temperature of the exhaust gases at a temperature sufficiently high to initiate the catalytic action of the catalyst disposed in the catalytic converter. Some secondary combustion may in fact take place in the manifold upstream of the converter to partially raise exhaust gas temperature due to the introduction of the secondary air.

Let us now turn to FIG. 2 in which a cross-flow type cylinder head 1a is shown which is basically the same as that in FIG. 1 with the exception that the two inboard exhaust ports 7b, 7c are in fact siamesed or joined to form a single outlet. This configuration is possible under given conditions which are: the firing or ignition order of the four cylinders is either #1, #3, #4, #2 or #1, #2,

4, #3, i.e. the two inboard cylinders #2, #3 are not subsequently fired to produce secondary air supply reducing pulsations which follow each other down to and out of the common siamesed port.

In FIG. 3, a second embodiment of this invention is shown in schematic plan view which is a six cylinder in-line terminal combustion engine.

Indicated by the numeral 1b is a cross-flow type cylinder head having formed therein six combustion chambers 2a, 2b, 2c, 2d, 2e and 2f which define the upper portions of the cylinders #1, #2, #3, #4, #5 and #6. However the construction details are the same as in FIG. 1 other than there are six cylinders and not four. Similar to the case of FIG. 1, the endmost cylinders #1 and #6 have their respective inlet ports 20a, 20f formed inboard of the corresponding exhaust ports 21a, 21f so that the overall length of the induction manifold 15 can be reduced. Also similar to the embodiment of FIG. 1, adjacent inlet ports, i.e. 20a, 20b and 20c, 20d and 20e, 20f are arranged as shown close together for unifying (substantially) the flow path between the carburetor and each inlet port. The exhaust ports, as in the first embodiment substantially open into diametrically opposed quadrants for the same reason as set forth in connection with the first embodiment i.e. directing the charge into the combustion chamber to initiate a swirling gas pattern therein.

The exhaust manifold in this embodiment is somewhat different to that of the first embodiment but has basically two branch portions. The first branch portion is arranged to receive exhaust gases from the exhaust ports 7a, 7b and 7c. The second is arranged to receive exhaust gases from the exhaust ports 7d, 7e and 7f. This arrangement as before is to isolate the exhaust gas pulsation in a way as to eliminate mutual interference therebetween and therefore promote the efficiency of the secondary air supply system. As shown the two branch portions are joined and connected to an exhaust pipe 10.

It is preferred in both of the embodiments of the invention that the location of the two spark plugs be arranged in each combustion chamber; so that they are diametrically opposed of the center axis of the cylinder, equidistant from same and the spark gaps separated by a distance L where $L = (0.45$ to $0.67)D$, D being the diameter of the cylinder. Furthermore to achieve the minimum combustion time it is preferred that the sparks are produced synchronously by preferably the same distributor and associated ignition system.

In both embodiments an insulated exhaust manifold can be if desired followed by an insulated exhaust tube or pipe whereby the temperature of the exhaust gases is maintained adequately for treatment in the catalytic converter. The cylinder head construction shown in FIG. 2 is also of some value in this regard also being formed with siamesed ports which as is well known tends to reduce the heat loss through the cylinder head.

The EGR system described earlier is designed to recirculate a large amount of exhaust gases, also referred to earlier and in fact the EGR system is preferably arranged to recirculate gases at a rate of up to 40%, the rate of recirculation being defined by the following:

$$EGR\ rate\ \% = \frac{\text{volume of recirculated gas}}{\text{volume of inducted air}}$$

Furthermore it is further preferred that the maximum rate of recirculation be between 12 and 40% (as defined above) depending on the given operative mode of the engine.

It deemed necessary the reed valve which inducts or pumps air into the exhaust manifold may be replaced with a conventional air pump.

Thus from the foregoing description it will be appreciated that through the combination of simple and often well known pieces of apparatus an internal combustion engine with outstanding performance characteristics and which emits very small amounts of toxic or noxious compounds and simultaneously exhibits good fuel economy is obtained.

What is claimed is:

1. A multi-cylinder internal combustion engine characterized by the combination of:

a cross flow type cylinder head;

a plurality of simply configured combustion chambers formed in the cylinder head, the configuration of the combustion chambers being such that it tends to minimize surface area to volume ratio of said chambers;

a plurality of inlet ports formed through the cylinder head, each of which fluidly communicates with the combustion chamber via an inlet valve;

air fuel mixture forming means operatively connected to an induction manifold and arranged to produce an air-fuel mixture which has an air:fuel ratio of between 13:1 and 16:1;

a plurality of exhaust ports formed through the cylinder head each of which fluidly communicates with a combustion chamber via an exhaust valve, the arrangement of the inlet ports and the exhaust ports being such that the inlet ports of the most outboard cylinders are located inboard of the corresponding exhaust ports so that the overall length of the induction manifold can be minimized and the inlet ports are each offset with respect to the cylinder axis which passes through the respective cylinder into which, each set inlet port opens said arrangement introducing the air-fuel mixture into said combustion chambers with a relatively large momentum in a direction parallel to the plane which normally intersects said cylinder axis relative to the momentum parallel to said cylinder axis thereby producing swirling within said combustion chambers; and a plurality of pairs of symmetrically arranged, synchronously sparked, spark plugs with each said pair being projected through the cylinder head and exposed to one combustion chamber with the individual members of each pair diametrically opposed with respect to the cylinder axis passing through said one combustion chamber so that $L = (0.45$ to $0.67)D$ where L = the distance between the spark gaps of said pairs of spark plugs and D = the diameter of the cylinder;

an exhaust manifold having first and second branch portions, each of said branch portions fluidly communicating with half of the total number of cylinders of said multicylinder engine;

a secondary air supply system operatively connected to the exhaust manifolds so as to introduce secondary air into the exhaust ports thereby intimately mixing secondary air with the exhaust gases;

and EGR system recirculating the exhaust gases from the exhaust manifold to the induction manifold at a rate of up to 40% where the EGR rate is defined as $$EGR\ rate\ \% = \frac{\text{volume of recirculated gas}}{\text{volume of inducted air}} \times \frac{100}{1}$$

a catalytic converter containing an oxidation catalyst therein which receives exhaust gases mixed with secondary air for the oxidation of HC and CO contained therein via an exhaust tube.

2. A multi cylinder internal combustion engine as claimed in claim 1 wherein said secondary air supply system is characterized by:

first conduit means, the downstream end of which is fluidly connected to the exhaust manifold through a plurality of first branch portions, said branch portion opening into the exhaust ports, and operatively disposed in the upstream end of which is a reed valve operable by exhaust gas pulsations introduced into the conduit means through said first branch portions to induct and pump atmospheric air through an air filter and into said conduit means and exhaust manifold.

3. A multi cylinder internal combustion engine as claimed in claim 1 wherein said EGR system is characterized by:

second conduit means fluidly interconnecting the exhaust manifold and the induction manifold for conveying exhaust gases thereto; and control means disposed in said conduit means which is arranged to vary communication between the exhaust manifold and the induction manifold in response to predetermined operating parameters of the engine.

4. A multi cylinder internal combustion engine as claimed in claim 1 wherein said engine is an in-line four cylinder internal combustion engine.

5. A multi cylinder internal combustion engine as claimed in claim 1 wherein said engine is an in-line six cylinder internal combustion engine.

6. A multi cylinder internal combustion engine as claimed in claim 4 wherein said first branch portion of the exhaust manifold is connected to the engine so as to receive the exhaust gases from the two inboard cylinders and the second branch portion connected so as to receive exhaust gases from the two outboard cylinders and said induction manifold is so constructed and arranged that the gaseous flow paths therebetween to each cylinder are equal in length.

7. A multi cylinder internal combustion engine as claimed in claim 5 wherein the first three cylinders are fluidly communicated with first branch portion of the exhaust manifold and the remaining three cylinders connected to said second branch portion.

8. A multi cylinder internal combustion engine as claimed in claim 1 wherein said air fuel forming means is a carburetor.

9. A multi cylinder internal combustion engine as claimed in claim 1 wherein said air fuel forming means is at least one fuel injector.

10. A multi cylinder internal combustion engine as claimed in claim 4 in which the two inboard exhaust ports are siamesed to form a single outlet in the side of the cylinder head and in which the combustion chambers respectively communicating with the two siamesed ports are not subsequently ignited.

11. A multi cylinder internal combustion engine as claimed in claim 1 wherein a heat insulating port liner is disposed in each of the exhaust ports.

12. A multi cylinder internal combustion engine as claimed in claim 1 wherein said simply configured combustion chamber has a hemispherical configuration.

13. A multi cylinder internal combustion engine as claimed in claim 1 wherein said simply configured combustion chamber has a bath tub type configuration.

14. A multi cylinder internal combustion engine as claimed in claim 1 wherein said simply configured combustion chamber has a heron type configuration.

15. A multi cylinder internal combustion engine as claimed in claim 1 wherein said simply configured combustion chamber has a flat type configuration.

16. A method of operating a multi cylinder internal combustion engine of the in-line type which is equipped with a cross-flow type cylinder head comprising the steps of:

preparing a combustible charge containing air, EGR gas and a hydrocarbon fuel which has an air:fuel ratio in the range of 13:1 to 16:1 and contains EGR gas recirculated at a rate of up to 40%;

feeding said charge through an induction manifold which is arranged to have the minimum possible overall length by arranging the inlet ports of the most outboard cylinders, inboard of the corresponding exhaust ports;

introducing the charge through inlet ports into simply configured combustion chambers so that the charge swirls within the combustion chambers;

igniting the charge by using two symmetrically disposed, diametrically opposed, synchronously sparked spark plugs projected through the cylinder head so that the spark gaps thereof are spaced by a distance L defined as follows, $L = (0.45\ to\ 0.67)D$ where D is the diameter of the cylinders;

discharging the combustion products resulting from said ignition through individual exhaust ports;

mixing secondary air with the combustion products in the exhaust ports;

supplying said secondary air via a reed valve operated by the pulsations of the combustion products in the exhaust ports;

recirculating a portion of the combustion products to the induction manifold for the preparation of the combustible mixture; and oxidizing the HC and CO in the remaining unrecirculated combustion products via the secondary air mixed therewith in an oxidizing type catalytic converter.

17. In a multi cylinder internal combustion engine the combination of:

a cross flow type cylinder head;

a plurality of simply configured combustion chambers formed in said cylinder head, the configuration of the combustion chambers tending to minimize the surface area to volume ratio of said combustion chambers;

a plurality of inlet ports formed through said cylinder head, each of said inlet ports communicating with one of said plurality of simply configured combustion chambers via an inlet valve;

a plurality of exhaust ports formed through said cylinder head, each of said exhaust ports communicating with one of said plurality of simply configured combustion chambers via an exhaust valve;

a plurality of pairs of symmetrically arranged synchronously sparked spark plugs, each pair of spark plugs being projected through said cylinder head so as to be exposed to one simply configured combustion chamber and each member diametrically opposed to each other member with respect to the cylinder axis which passes through said one simply configured combustion chamber so that:

$L = (0.45$ to $0.67)D$ where L the distance between the spark gaps of said pairs of spark plugs and D = the diameter of the cylinder; L = air-fuel mixture forming means for forming an air-fuel mixture which has an air:fuel ration of between 13:1 and 16:1;

an induction manifold fluidly interconnecting said air-fuel mixture forming means and said plurality of inlet ports, said induction manifold feeding said air-fuel mixture to each of said inlet ports via flow paths which are equal in length; with said inlet ports of the most outboard cylinders located inboard of the corresponding exhaust ports thereby minimizing overall length of said induction manifold and said flow paths, said inlet ports introducing said air-fuel mixture into said simply configured combustion chambers so as to have a relatively large momentum parallel to a plane which normally intersects said cylinder axis, relative to the momentum parallel to said cylinder axis and to be offset with respect to said cylinder axis producing swirling from said air-fuel mixture within said combustion chambers and associated cylinders;

an uninsulated exhaust manifold fluidly communicating with said exhaust ports, said exhaust manifold having first and second branch portions, each of said branch portions fluidly communicating with half of the total number of cylinders of said multi cylinder engine to prevent mutual interference between consecutive exhaust gas pulsations;

a secondary air supply system operatively connected to said exhaust manifold for introducing secondary air into said exhaust ports;

a reed valve operatively disposed in said secondary air supply system for pumping air from an air cleaner in communication with the ambient atmosphere to said exhaust ports, said reed valve being operable under the influence of said exhaust gas pulsations;

an EGR system fluidly interconnected between said exhaust manifold and said induction manifold for recirculating exhaust gases from said exhaust manifold to said induction manifold, said EGR system recirculating exhaust gases at a rate of up to 40% where the EGR rate is defined by:

$$EGR\ rate\ \% = \frac{\text{volume of recirculated gas}}{\text{volume of inducted air}} \times \frac{100}{1}$$

a catalytic converter containing an oxidizing type catalyst, said catalytic converter being fluid communicated with said exhaust manifold to receive a mixture of exhaust gases and secondary air therein for oxidizing the HC and CO contained in said exhaust gases.

* * * * *